Dec. 4, 1962 C. G. BARFIELD 3,066,467
COTTON PICKER MOISTENER
Filed Dec. 7, 1959
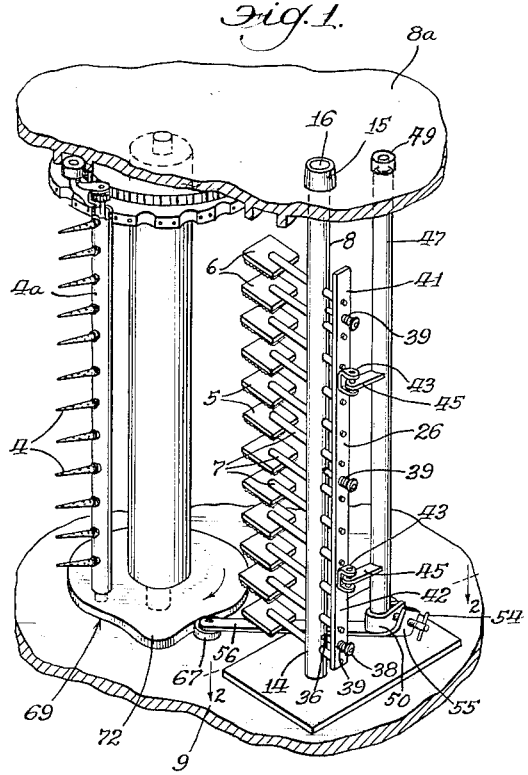
INVENTOR.
Charles G. Barfield
BY
Paul O. Pippel
Atty.

3,066,467
COTTON PICKER MOISTENER
Charles G. Barfield, West Memphis, Ark., assignor to International Harvester Company, Chicago, Ill., a corporation of New Jersey
Filed Dec. 7, 1959, Ser. No. 857,853
7 Claims. (Cl. 56—44)

This invention relates to a moistening mechanism for use in a cotton harvester and more specifically is directed to a fluid distributor mechanism used in the moistening system.

A typical cotton picker of the general character to which the invention is applicable is shown in U.S. patent to Johnson, 2,140,631. Such a cotton picker includes a mobile or ambulatory frame on which there is mounted the cotton picker or harvester unit. Each such unit comprises a rotatable drum having a plurality of circumferentially spaced columns from each of which projects a vertical series of picker spindles, the spindles being vertically stacked and arranged in horizontal layers, and each spindle being rotatable about its individual axis and revolved bodily about a horizontal orbit pursuant to rotation of the drum. The spindles are usually barbed so as to improve their aggressiveness in picking cotton from the plants. It is a general practice to moisten the spindles before they enter the cotton plants in order to increase the picking efficiency of the spindles and to minimize the accumulation or accretions of plant juices or other matter on the spindles and to facilitate the doffing or sweeping of the cotton from the spindles.

Various devices have been suggested to meter or control the amounts of fluid applied to the spindles. It will be readily realized that a certain amount of moisture on the spindles provides an optimum condition, while too little may, in fact, contribute to accretions of plant matter on the plants, etc. and too much fluid dampens the cotton so as to downgrade it and in addition exhausts the supply tanks too frequently so that there is that necessity of continually adding water.

It is a primary object of this invention to provide a moistening mechanism for use with a cotton harvester which incorporates a metering mechanism for providing an accurate and uniform amount of fluid to each moistening pad.

A more specific object of the invention is to provide a novel combination control valve and pump for each moistener which not only admits a predetermined quantity of water but which forcibly ejects the water into the moistening pad.

A still further object of the invention is to provide a novel simple and efficient metering system wherein the parts may be readily regulated and which will be exceptionally clog-free and efficient in use.

These and other objects and advantages of the invention will become apparent to those skilled in the art from the specification and the drawings, wherein:

FIGURE 1 is a fragmentary perspective view of the moistening apparatus and portions of the associated cotton picking spindles;

FIGURE 2 is a sectional view taken substantially on the line 2—2 of FIGURE 1; and FIGURE 3 is a fragmentary enlarged side elevational view of the moistening mechanism with parts shown in vertical section.

The moistening apparatus generally designated 2 is normally mounted in a cotton harvester housing in a position shown in U.S. Patent 2,140,631. For purposes of the present disclosure, it is sufficient to recognize that the moistener is proximate to the cotton picker spindle drums whereby spindles 4 carried on upright columns 4a may move adjacent and in contact with moistening pads 5 of the moistening apparatus generally designated 5a.

As best seen in FIGURE 1, there is a moistening pad 5 for each horizontal row of spindles and each of these pads each are mounted on a holder 6 which is connected to a tube or pipe 7 which in turn is mounted on a hollow fluid containing conduit 8 which is vertically disposed and is mounted between the top and bottom walls 8a and 9 of the picker drum housing as well understood by those skilled in the art. Each tube 7 extends through horizontally aligned openings 11 and 12 in the tube 8 and has a central bore 13 which communicates through an opening 14 preferably provided on the top of the tube 7 with the internal bore 14a of the tube 8. The upper end 15 of the moistener stand member 8 is provided with an inlet 16 to which fluid is supplied to the column 8 from a source of supply such as a tank (not shown) which is mounted on the ambulatory unit.

A combination piston and valve stem member 20 of cylindrical form extends through the rear extremity 21 of each tube 7 and has fluid-tight engagement with the surface of the bore 13 and the stem 20 has an axial extent such that in its closed position it extends beyond the opening 14 while the limiting collar 22 provided on the stem 20 intermediate its ends abuts as at 23 against the back end of tube 7 at side 24 of the column 8.

The piston members 20 are operated by an actuating mechanism or rocker assembly generally designated 25. The actuating mechanism 25 comprises a connecting element or bar 26 which extends generally parallel to the tube 8 along its back side 24, the bar being provided with a series of openings 27 admitting the rear ends 28 of the stems 20 therethrough. The forward side 29 of the bar seats as at 30 against the back side of the collar 22 and the back side 31 of the bar is engaged by a suitable locking device such as a pin or cotter key 32 which extends through an appropriate opening or hole in the rear extremity of the portion 28 whereby the bar 26 and the stem 20 move axially of the bore 13 in unison. The bar 26 interconnects all of the members 20 so that they operate together.

The bar 26 is biased in the closing direction of the stems 20 by means of the return mechanisms generally designated 35. Each mechanism 35 includes a pin 36 connected to the back side of the column or tube 8 and projecting through an opening 37 in the bar 26 and mounting between the rear side 31 of the bar and a rearwardly spaced abutment in the form of a washer 38, a compression spring 39 which is under compression between the side 31 of the bar and the abutment washer 38, the washer being retained on the pin 36 by a key or cotter 40 which extends through an appropriate opening in the distal or rear end of the pin 36. Thus it will be seen that the member 26 is constantly being urged toward the column 8 and thus the members 20 are biased to closing position.

It will be noted from a consideration of FIGURE 1 that there are three such spring assemblies 35 disposed adjacent to the top and bottom and intermediate the ends of the bar 26. The bar 26 is provided on its back side 31 adjacent to its upper and lower ends 41 and 42 with a pair of connecting brackets or ears or hinge members 43 which provide pivotal connections via pins 44 to the actuating arms 45 which are connected to the rockshaft 47 which is vertically disposed and generally parallel to the column 8. The member 47 is journalled at its upper and lower ends by means of bearings 49 and 50 from the upper and lower housing portions 8a, 9 and its lower end is provided with an outstanding arm or stop in the form of a lug structure 52 fixed thereto, the lug structure being engaged by one end 53 of an adjusting member 54 which comprises a screw member threaded through an upstanding ear or lug 55 on the cam arm 56, the member 54 being suitably locked in position by means of the locking nut 57. The arm 56 is pivoted intermediate its ends as at 60 about the rockshaft 47 and is biased by a tension spring assembly 62 which is connected as at 63 to the arm 56 intermediate its ends and at its other end as at 64 to an anchor 65 mounted on the bottom support 9, the spring 62 functioning to rotate the arm 56 in a direction engaging the cam roller 67 with the annular or circular periphery or cam profile 68 on the lower end 69 of the drum structure 3 or picker bar pedestal which rotates about a vertical axis and is journalled from the top and bottom portions of the picker housing as well known. The lower plate or base of the picker bar pedestal structure 69 is provided with a cam lobe 72 which projects radially outwardly from the periphery 68, said lobe having a profile which displaces the arm 56 in a direction rotating the cam arm in a counterclockwise direction (FIGURE 2) which in turn rotates the rockshaft 47 in a counterclockwise direction causing the bar assembly 26 to move rearwardly, that is to the right, as seen in FIGURE 2, and thus moving the valve members 20 to the right as seen in FIGURE 3, and withdrawing the members 20 a distance which is pre-set by the setting of the control member 54. Thus if more fluid is required, the adjusting member 54 is set so that maximum movement of the bar 26 is obtained and the leading end 77 of each stem 20 entirely clears the port 14 so that a maximum amount of fluid will descend into the tube bore 13, it being understood that all of the column 8 is filled with liquid at all times. If a lesser amount of fluid is required, the adjusting screw is so turned that a lesser stroke of the cam arm 56 is obtained with consequent lesser uncovering of the ports 14. Thus the volume of water is controlled not only by the aperture size but also by the time lag between opening and closing of the valve stems. It will also be noted that on each stroke the member 20 of each valve unit serves as a pump or a piston for forcibly moving the fluid into the associated pad.

While only one form of the invention has been shown, it should be recognized that other forms and variations will be readily apparent to those skilled in the art, and it will also be understood that the foregoing embodiment has been chosen merely for illustration and not to limit or narrow the invention and that the scope thereof is to be determined by the nature of the appended claims.

What is claimed is:

1. A moistener assembly for a cotton harvester comprising: an upright tubular member having a liquid-containing central opening, a plurality of vertically spaced elements extending through the member and having a bore and an inlet port communicating with the bore in the element and said opening in the member, each element having moistening means thereon disposed in receiving relation to fluid discharged from the associated bore, a piston in each bore, and operating means operatively associated with each piston for opening and closing said port.

2. The invention according to claim 1 and said operating means comprising an equalizer bar interconnecting all of said pistons, and means including spring means reactively connected between said member and bar for biasing said bar to the closed position of the pistons.

3. A moistener assembly for a cotton harvester comprising: an upright hollow column having a wall structure with a plurality of vertically spaced transversely aligned pairs of openings, a tubular moistener supporting member extending through each pair of openings and having a central bore and a port intermediate its ends communicating with the interior of the column and the bore, and piston means extending into the bore from one end of the member and reciprocal therein to covering and uncovering positions with respect to said port and movable past the port in ejecting liquid from the bore into an associated moistener.

4. A moistener assembly for a cotton harvester comprising a driven upright drum including a plurality of bars with spindles thereon arranged in horizontal vertically spaced rows and having a member with a cam profile rotatable therewith, an upright column with a plurality of fluid conducting tubes one for each row of spindles, a moistener on one end of each tube proximate the spindles for wiping cooperation therewith, each tube having a bore communicating at one end with the associated moistener and open at the other end and having a fluid-supply port intermediate its ends communicating with the bore, a piston in each bore extending through the open end thereof, and an operating linkage operatively associated with the pistons and said cam profile for reciprocating said pistons into closing and opening positions with respect to the respective fluid inlet ports.

5. The invention according to claim 4 and said linkage comprising a cam arm spring biased against the cam profile and a rocker assembly operatively connected thereto and to said pistons for translating movement of the arm to the pistons attendant to rotation of the drum.

6. The invention according to claim 5 and said rocker assembly comprising a rockshaft having arm means, an equalizer member interconnecting all of the pistons with the arm means, and an adjustable connection between the arms and the rockshaft for controlling the stroke length of the pistons.

7. A moistener for a cotton picker comprising a hollow column, a plurality of pipes mounted thereon and each having a port communicating with the interior of the column, a moistener pad assembly mounted on one end of the tube, and a combination valve and injector mechanism extending into the pipe from its other end.

References Cited in the file of this patent

UNITED STATES PATENTS

| 2,117,424 | Huey | May 17, 1938 |
| 2,651,160 | Lucius | Sept. 8, 1953 |
| 2,660,850 | Rust | Dec. 1, 1953 |
| 2,821,434 | Hunter et al. | Jan 28, 1958 |
| 2,876,611 | Hubbard | Mar. 10, 1959 |